April 26, 1949. G. W. WALLACE ET AL 2,468,695
METHOD OF MAKING UNIT DISPENSING PACKAGES
Filed Aug. 1, 1945 6 Sheets-Sheet 1

INVENTORS
George W. Wallace and James W. Trew
BY
Wilfred E. Lawson
Atty.

April 26, 1949.   G. W. WALLACE ET AL   2,468,695
METHOD OF MAKING UNIT DISPENSING PACKAGES Filed Aug. 1, 1945   6 Sheets-Sheet 2

INVENTORS
George W. Wallace and James W. Trew
BY
Wilfred E. Lausen
Atty.

April 26, 1949. G. W. WALLACE ET AL 2,468,695
METHOD OF MAKING UNIT DISPENSING PACKAGES
Filed Aug. 1, 1945 6 Sheets-Sheet 3

INVENTORS
George W. Wallace and James W. Trew
BY Wilfred E. Lawson
Atty.

April 26, 1949.  G. W. WALLACE ET AL  2,468,695
METHOD OF MAKING UNIT DISPENSING PACKAGES
Filed Aug. 1, 1945  6 Sheets—Sheet 4

INVENTORS
George W. Wallace and James W. Trew
BY
Wilfred E. Lawson
Atty.

April 26, 1949.　　G. W. WALLACE ET AL　　2,468,695
METHOD OF MAKING UNIT DISPENSING PACKAGES
Filed Aug. 1, 1945　　6 Sheets—Sheet 5

INVENTORS
George W. Wallace and James W. Trew
BY
Wilfred E. Lawson
Atty.

April 26, 1949.  G. W. WALLACE ET AL  2,468,695
METHOD OF MAKING UNIT DISPENSING PACKAGES
Filed Aug. 1, 1945  6 Sheets-Sheet 6
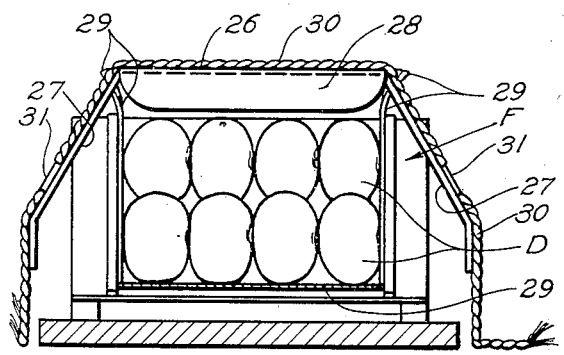
_Fig. 26_
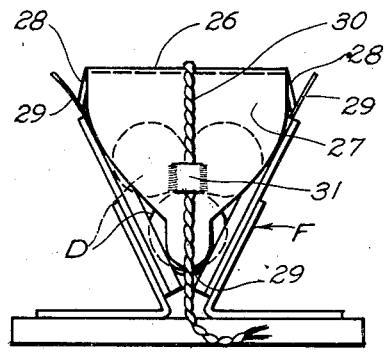
_Fig. 27_
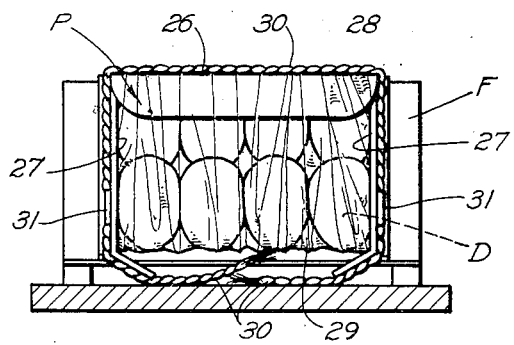
_Fig. 28_
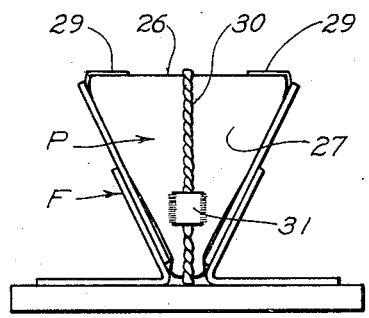
_Fig. 29_
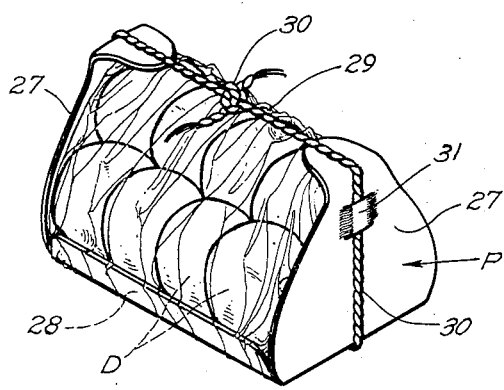
_Fig. 31_
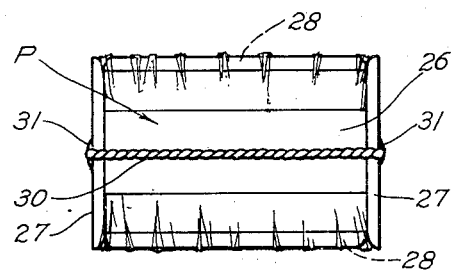
_Fig. 30_
INVENTORS
George W. Wallace and James W. Trew
BY Wilfred E. Lawson
Atty.

Patented Apr. 26, 1949

2,468,695

UNITED STATES PATENT OFFICE 2,468,695

METHOD OF MAKING UNIT DISPENSING PACKAGES

George W. Wallace, Waynesboro, and James W. Trew, Gettysburg, Pa.

Application August 1, 1945, Serial No. 608,193

2 Claims. (Cl. 93—2)

This invention relates to a unit dispensing package and to methods of making the same and it is primarily an object of the invention to provide a package of this kind whereby in its production the container is built around the content.

It is also an object of the invention to provide a package and a method of producing the same wherein is embodied a unit package for fruit or kindred commodities whereby the commodity may be readily handled for distribution in a predetermined bulk and wherein the package is so constructed as to permit visual access to the major portion of the content and in a manner without lessening the strength or efficiency of the package.

A still further object of the invention is to produce a unit package constructed and assembled in a manner whereby its handling, both in initial shipment and by the consumer, can be readily accomplished and whereby the package as a unit permits of effective display of its content.

Furthermore, it is an object of the invention to provide and produce a package for fruit and kindred commodities whereby the same may be delivered to the ultimate purchaser without requiring further packaging or wrapping and in a manner whereby the unit package may be conveniently carried by the ultimate consumer without necessitating the application of any further extraneous media.

The invention also has for an object to provide a unit package and a method of making the same wherein the container or envelope for the content is built around the content and wherein the container or envelope includes in its structure an integral part which constitutes a hand grasp for convenience in handling by the ultimate consumer.

A still further object of the invention is to provide a unit package and the means for producing the same wherein the package or envelope is built around the content in a manner whereby in the completed package the major portion of the content is open to visual inspection and also whereby the content is effectively maintained in a sanitary condition.

It is a still further object of the invention to provide a unit package assembled in a manner whereby in the completed package the particles of the content are maintained in their required positions as determined by the original arrangement of the content.

An object of the invention is to provide a novel commodity displaying and sale package and methods of forming the same, whereby the commodity is maintained in an attractive fully displayed condition and is at the same time fully protected against contamination from outside sources.

Another object of the invention is to provide a novel packaging set-up for commodities such as apples and other fruits and novel methods of forming the same, whereby such commodities are fully exposed to view in the package and are at the same time enveloped in a wrapping which is for the most part impervious to air and, therefore, not only protects the commodity from contamination but serves to maintain the same fresh and attractive over a longer period of time than would otherwise be the case, by retarding escape from within the package of the gases emanating from the fruit during the further natural ripening of the fruit.

An additional object of the invention is to provide a package wherein the enclosing envelope comprises two parts which, in their application to the content, possess inherent qualifications whereby, during the packaging operation, one of said parts readily adjusts itself as to variation of the length of the package as determined by the content and the other readily accommodates itself for any variation within certain limits of the transverse width of the package as determined by the content.

The invention consists in the details of construction and in the combination and arrangement of the several parts of our improved unit dispensing package and to methods of making the same, whereby certain important advantages are attained, as will be hereinafter more fully set forth.

In order that our invention may be better understood, we will now proceed to describe the same with reference to the accompanying drawings, wherein:

Figure 26 is a longitudinal vertical sectional view illustrating further steps as comprised in this third embodiment;

Figure 27 is a view in end elevation of Figure 26;

Figure 28 is a vertical sectional view with parts in elevation illustrating further steps of the method of packing;

Figure 29 is a view in end elevation of Figure 28;

Figure 30 is a view in bottom plan of the completed package; and

Figure 31 is a view in perspective of the completed package.

Figure 1:
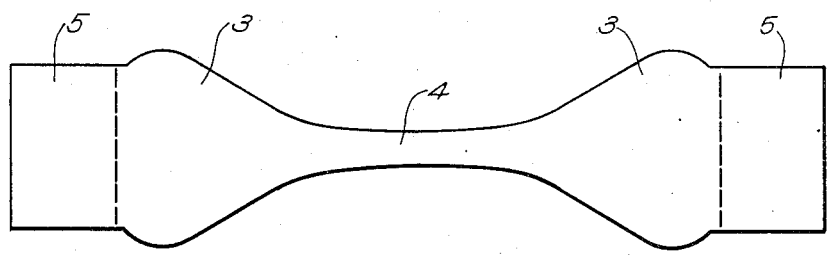
Figure 1 is a view in blank of the end panels and interposed hand grasp in accordance with an embodiment of the invention.
Figure 2:
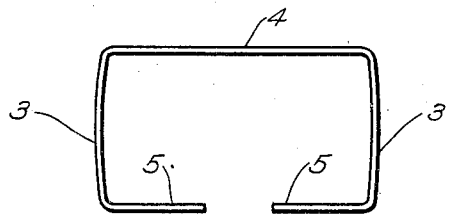
Figure 2 is a view in side elevation and of a diagrammatic character illustrating the blank as illustrated in Figure 1 in folded assembly.
Figure 3:
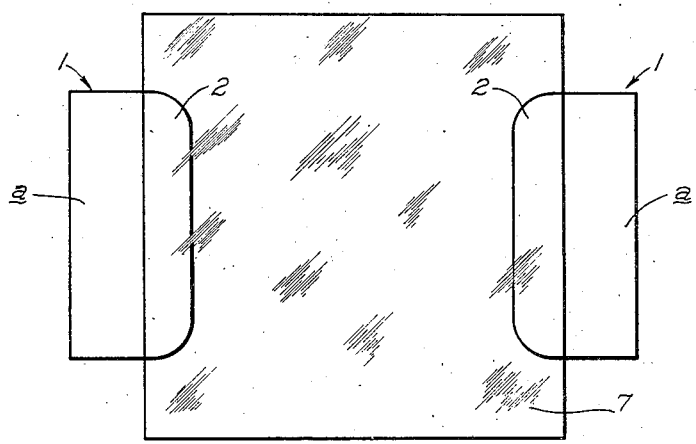
Figure 3 is a view in blank of the sections of the bottom tray and associated transparent sheet.
Figure 4:
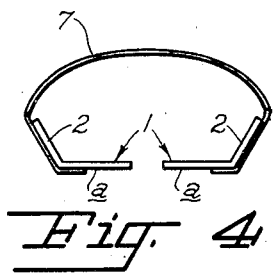
Figure 4 is a view in end elevation and of a diagrammatic character illustrating the blank as in Figure 3 in working assembly.
Figure 5:
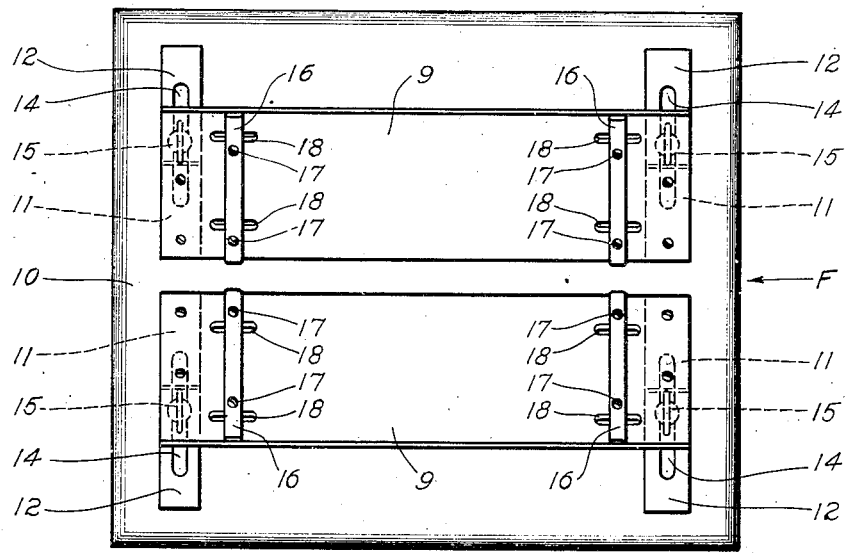
Figure 5 is a view in top plan of a form as herein embodied for producing the package.
Figure 6:
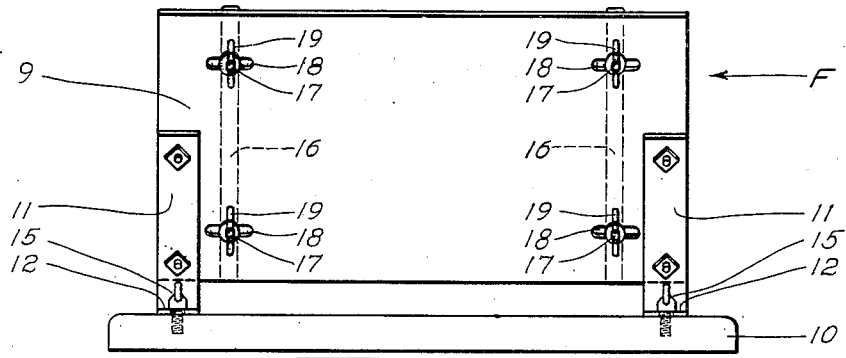
Figure 6 is a view in side elevation of the form as illustrated in Figure 5.
Figure 7:
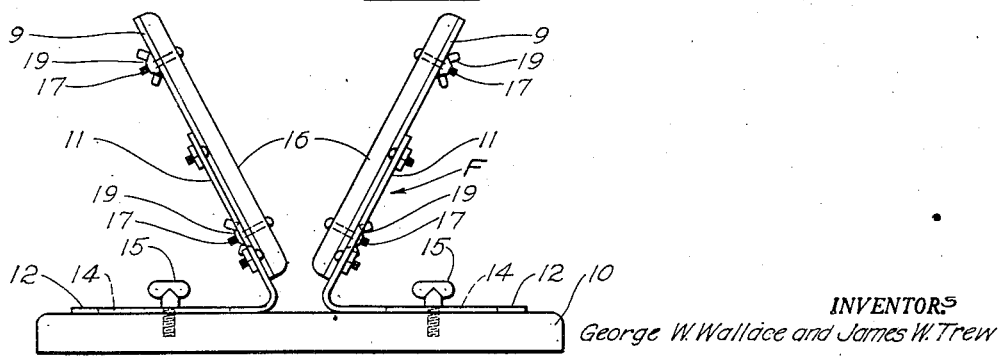
Figure 7 is a view in end elevation.
Figure 8:
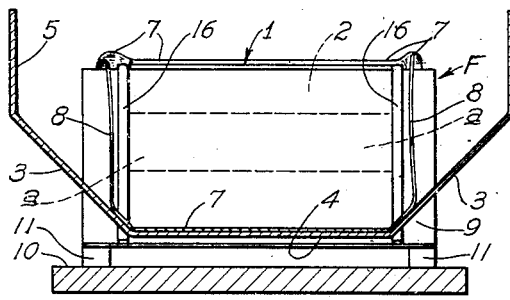
Figure 8 is a view partly in section and partly in elevation and of a diagrammatic character illustrating certain steps in connection with the production of a package.
Figure 9:
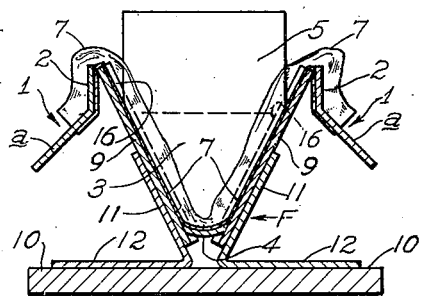
Figure 9 is a transverse sectional view taken through Figure 8.
Figure 10:
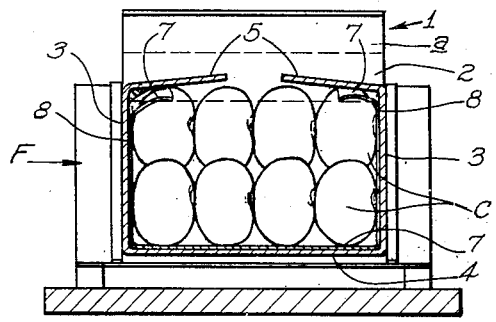
Figure 10 is a view similar to Figure 8 showing further steps in the process of producing the package.
Figure 11:
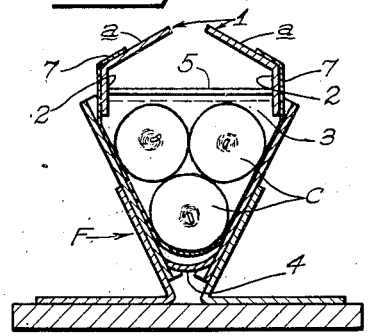
Figure 11 is a transverse sectional view taken through Figure 8.
Figure 12:
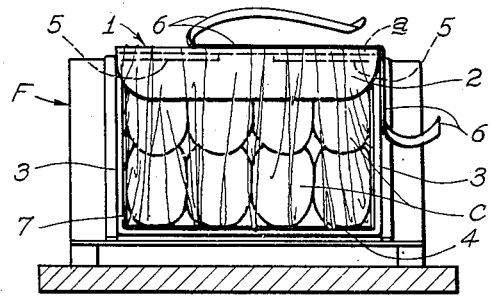
Figure 12 is a view partly in side elevation and partly in section illustrating still further steps in the production of the package.
Figure 13:
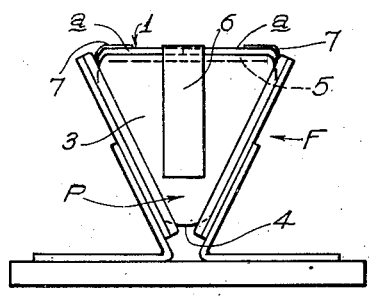
Figure 13 is a view in end elevation of Figure 12.
Figure 15:
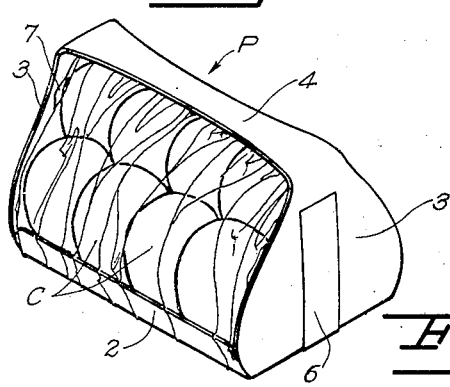
Figure 15 is a view in perspective of the completed package.
Figure 14:
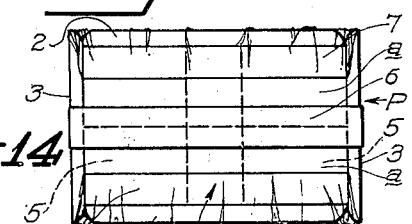
Figure 14 is a view in bottom plan of the completed package.

In the embodiment of the invention as illustrated in Figures 1 to 15, the package comprises a content C embodying a commodity of globular articles, such as apples, oranges or the like, and which is maintained by its enclosing envelope in an attractive predetermined form or design and in a manner which enables visual access to be had to the content of the package not only to permit ready inspection of such content but to further increase the attractiveness or esthetic value of the package.

This package P embodies a bottom panel 1 herein disclosed as rectangular in plan and of predetermined dimensions, with its side or longitudinal marginal portions defined by the outwardly disposed flaps 2 extending the entire length therealong.

The end panels 3 are herein disclosed as of a general V-shaped type with their apices or outer central portions connected by an interposed elongated member 4 preferably integral with the end panels 3. This member 4 provides a convenient hand grasp to facilitate the handling of the package and particularly by the purchasing public. However, this member 4 has a further advantage of constituting an effective means for maintaining the package in its completed form as it operates to hold the end panels 3 against undue outward swinging movement by effectively resisting the weight from within on said end panels 3 as created by the weight of the content C.

These end panels 3 are of considerable length and have the continued plates 5 preferably integral therewith which overlie the inner face of the bottom panel 1 at the opposite ends thereof and are interposed between the bottom panel 1 and the content C although it is believed to be obvious that, if preferred, these plates 5 can overlie the outer face of the bottom panel 1.

It is to be particularly noted that the bottom panel 1 is divided at its transverse center into two separate and substantially duplicate sections a and the adjacent marginal portions of these sections a are tied together, in the present embodiment of the invention, by a binder strip 6 extending entirely along the bottom panel 1 and which is also of such length as to extend a material distance along the outer faces of the flaps 2 for securement thereto. It will, therefore, be readily apparent that this strip 6 serves to effectively hold the sections a in desired assembled relation and also securely holds the end panels 3 in desired position.

Disposed transversely across the content C inwardly of the end panels 3 and the member 4 is a sheet 7 of flexible material of preferred type but preferably transparent and possessing an inherent qualification of delayed shrinkage. This sheet 7 is initially of such dimensions as to be in excess of the length of the content C so that the side marginal portions of said sheet 7 can be folded inwardly, as at 8, between the ends of the content C and the panels 3 and of a length to overlie the side marginal portions of the bottom panel 1 and adhesively secured thereto.

This applied sheet 7 is disposed over the content C with sufficient tightness to assure said content C against lateral displacement or derangement while at the same time this sheet 7, being transparent, permits ready visual access to the content C and more particularly by the ultimate consumer.

In addition to providing a package which can be readily and conveniently handled and which also allows for effective inspection of the content without derangement of the wrapper, the package is one wherein the content is effectively protected against contamination from outside foreign matter and also wherein the fruit is maintained fresh and attractive over a considerable period of time due to the fact that the package is one wherein is retarded the escape from within the package of the gases emanating from the fruit during the further natural ripening of the fruit after being packaged.

The package, as herein embodied, is also of particular importance and advantage as it is of a character whereby the package can be readily produced and in a manner or method whereby all of the packages will be of substantially the same form and appearance, with the further advantage that in the production of the package the parts comprised therein will readily compensate or allow for variations of the content C as to both length and width within, of course, certain limitations. The particular advantage of this is to make it possible to allow parts of the same sizes to be employed by the packer in connection with fruit or the like of various sizes.

As herein embodied, the method for producing the package as hereinbefore described comprises a form F including two side walls 9 disposed in downward convergence. These walls 9 are of lengths in excess of the maximum length of package to be produced and said walls are supported one independently of the other on a suitable base or floor 10 by the brackets 11.

Each of these brackets 11 includes an outstanding elongated foot 12 and is provided lengthwise thereof with a slot 14 through which are disposed holding or binding screws 15 threading into the base or floor 10. This slot 14 in each of the feet 12 allows the side walls 9 of the form F to be adjusted one with respect to the other as may be desired in accordance with the size of the fruit or other articles to be packed.

The opposite end portions of each of the side walls 9 of the form F each has disposed transversely across its inner face the end holding strips 16 which may be of any material preferred but preferably possessing a certain amount of cushioning quality so as to minimize the liability of injury to the end articles of the content C which may bear thereagainst. Each of these strips 16 carries the outstanding shank 17 which are directed through the slots 18 disposed lengthwise of a side wall 9 of the form F.

Engaged with each of these shanks 17 outwardly of the wall 9 is a holding member 19 disclosed as a nut threading thereon. This mounting of the strips 16 allows the same to be selectively adjusted lengthwise of the side walls 9 within the limits of the slots 18, whereby these strips 16 may be properly adjusted in accordance with the length desired for the content C.

After the form F has been properly adjusted, the sheet 7 is placed across the form F and which sheet is of such dimensions as to extend beyond the opposite ends of the side walls 9 of the form F, and to extend thereabove. The articles of the content C, such as apples or the like, are then stacked between the side walls 9 of the form F and between the holding strips 16.

In the present embodiment of the invention, the content C comprises two layers, the layer first applied being a single row and the second layer being a double row, so that the stacked content will be substantially in the form of a V in cross section. The layers of the content C may be increased as desired and, of course, as may be permitted by the size of the form F.

Before the sheet 7 is applied, the member 4 connecting a pair of end panels 3 is placed between the lower marginal portions of the side walls 9 of the form F and after the content has been stacked, the end panels 3 are folded up closely against the ends of the stacked content C and the plates 5 carried thereby are folded down upon the top of the content C as held within the form F. The bottom panel 1 is then disposed over the top of the content C within the form F and over the plates 5 and the bottom panel 1 is held or anchored to the end panels 3 by the binder strip 6. This binder strip 6 as applied also serves to hold the sections $a$ of the bottom panel 1 in assembly.

Before the sheet 7 is applied, the ends thereof have been adhesively or otherwise secured along the outer margins of the sections $a$ of the bottom panel 1 so that, as the sections $a$ of the bottom panel 1 are drawn into applied position, it is assured that requisite strain will be imposed on the sheet 7 to effect its proper placement transversely across the content C. This initial securement of the sections $a$ of the bottom panel 1 with the ends of the sheet 7 not only reduces the operations required in making a package but assures the proper production of the package. The side portions of the sheet 7 extend sufficiently beyond the ends of the sections $a$ of the bottom panel 1 to be folded inwardly sufficiently between the end panels 3 and the adjacent ends of the content C. After the package has been completed, as hereinbefore described, it is removed from the form F when inverted or with the bottom panel 1 downwardly, it is in proper position for display.

It is to be pointed out, however, that the particular design of the completed package as herein embodied is one which readily permits adjacent packages to interfit particularly when packed either for storage or for transportation.

While it has hereinbefore been particularly stated that the plates 5 will be positioned between the content C and the bottom panel 1, it is believed to be obvious, without illustration, that if preferred these plates 5 can be disposed over the outer face of the bottom panel 1.

It is also believed to be obvious that the bottom panel 1 and the plates 5 can be directly bonded by a suitable adhesive or otherwise and, therefore, not requiring the use of the holding strips 16.

Figure 16:
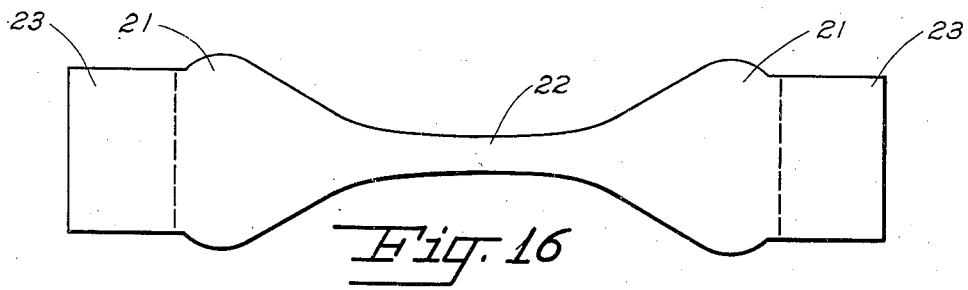
Figure 16 is a view in blank of a connecting or handle member as comprised in a further embodiment of the invention.
Figure 17:
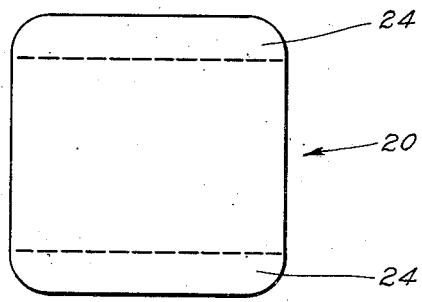
Figure 17 is a view in blank of the bottom panel as comprised in this second embodiment.
Figure 18:
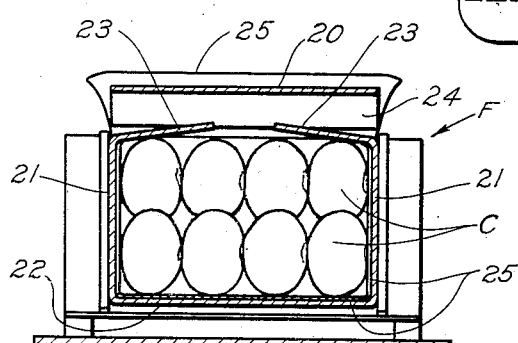
Figure 18 is a longitudinal sectional view with parts in elevation illustrating certain steps and features as comprised in this second embodiment.
Figure 19:
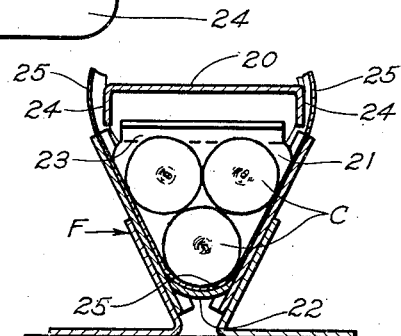
Figure 19 is a transverse sectional view taken through Figure 18.
Figure 20:
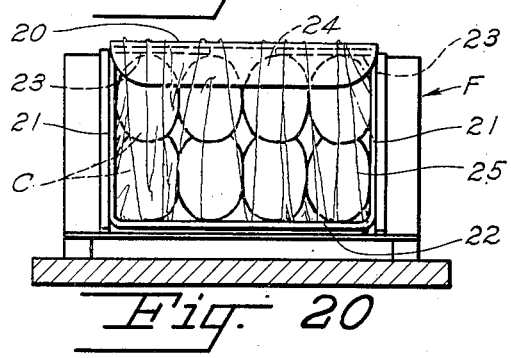
Figure 20 is a view in side elevation and partly in section illustrating a completed package.
Figure 21:
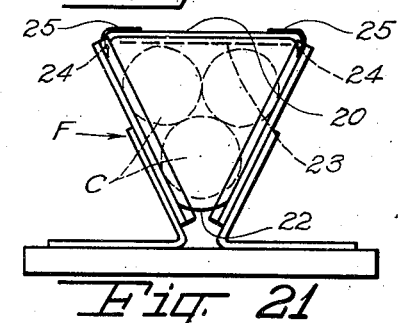
Figure 21 is a view in end elevation of the arrangement illustrated in Figure 20.

In the embodiment of the invention as illustrated in Figures 16 to 21 of the drawings, the bottom panel 20 is in one piece but the end panels 21, the connecting or handle member 22 and the extended plates 23 are substantially the same as hereinbefore set forth with respect to the corresponding parts in the first embodiment of the invention.

The method of producing the package in connection with this second embodiment of the invention is substantially the same as hereinbefore set forth with respect to the first embodiment except, of course, there is no need for bonding the bottom panel 20. It is to be pointed out, however, that in this second embodiment of the invention, the side flaps 24 of the bottom panel 20 are not initially bonded to the flexible transparent sheet 25.

In this second embodiment of the invention, the method, however, differs from the first method by the further step of bonding the sheet 25 to the plates 23 after said plates have been folded over the bottom panel 20 instead of having the bottom panel or any part thereof initially bonded to the sheet as in the first form of the invention.

Figure 22:
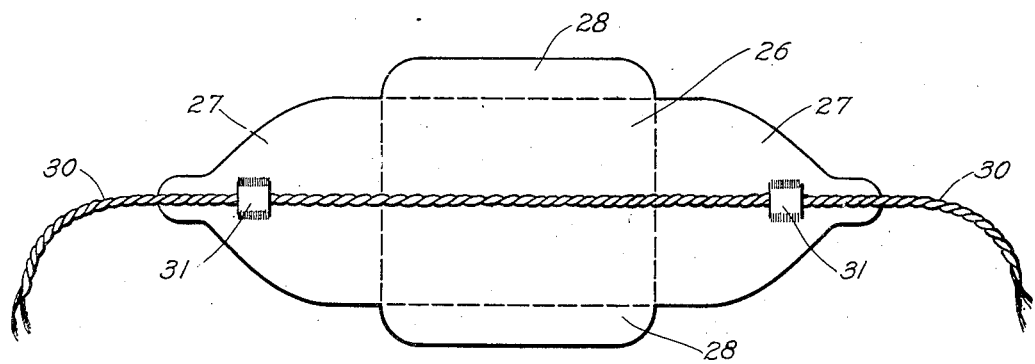
Figure 22 is a view in blank of a bottom panel and end panels showing a still further embodiment of the invention.
Figure 23:
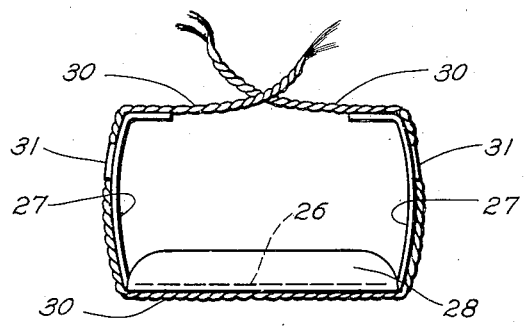
Figure 23 is a view in side elevation and of a somewhat diagrammatic character of the blank as illustrated in Figure 22 in folded arrangement to illustrate certain steps of the method.
Figure 24:
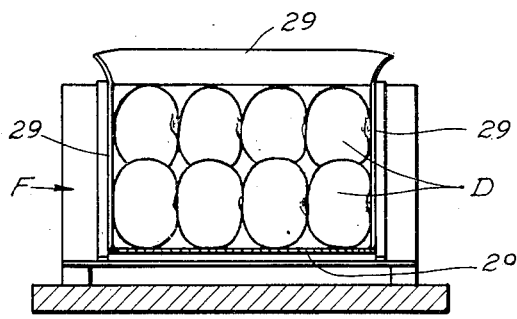
Figure 24 is a view partly in longitudinal section and partly in elevation illustrating certain steps in this third embodiment.
Figure 25:
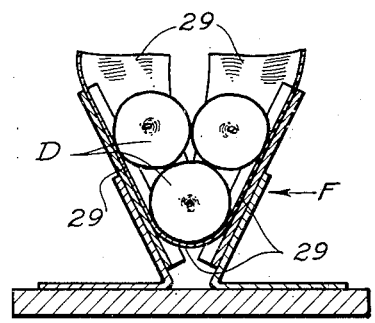
Figure 25 is a vertical sectional view taken through Figure 24.

In the embodiment of the invention as illustrated in Figures 22 to 31 of the drawings, the bottom panel 26 has integral therewith the end panels 27 as are, of course, the side flaps 28. It is also to be noted that the end panels 27 do not have their outer extremities connected but said panels 27 are entirely free one from the other.

In this embodiment of the invention, the package is produced by first placing the flexible sheet 29 in proper position upon the form F and after the content D has been properly stacked or arranged within the form upon the sheet 29, the bottom panel 26 is placed over the content D and the ends of the flexible sheet 29 are drawn over the side flaps 28 and bonded to the bottom panel 26. The side flaps 27 are then folded down into close contact with the ends of the content D, whereupon the enveloped content D is lifted out of the form and the end panels 27 held in close contact with the content D by the flexible tie member 30. This tie member 30, as herein embodied, extends outwardly along the bottom panel 26 at the transverse center thereof and up under the guide and holding lugs 31 carried by the outer portions of the side flaps 28 adjacent the free ends thereof.

This tie member 30 is of such length as to have its free end portions extend entirely across the top of the package so that the extremities thereof may be readily tied to assure the maintenance of the package. The tie extremities of the member 30, or that portion of the member 30 extending across the top of the package, provides a hand grasp to facilitate the ready handling of the package.

It is to be stated that as the end panels 27 are initially folded against the ends of the content D, the adjacent marginal portions of the sheet 29 are folded to extend between said panels 27 and the adjacent ends of the content D.

While in this embodiment of the invention, the tie member 30 is shown as knotted together, it is believed to be obvious that with equal facility a suitable clamp may be employed to advantage. It is believed to be obvious that the manner of connecting the extremities of the tie member 30 in itself forms no particular part of the invention.

It is to be particularly pointed out in connection with the several embodiments of the invention as herein disclosed that the character of the parts comprised in the envelope for the package are such as to readily adjust themselves to packages of varying sizes within certain limitations and it is to be further pointed out that the efficiency of the package is materially increased by having the various bottom panels and end panels of a rigidity greater than that of the transparent sheet employed.

It is also to be pointed out that in each of the embodiments of the invention, the side flaps associated with the bottom panel serve to give further rigidity to the bottom panel and particularly as against transverse flexure. These side flaps in each embodiment of the invention also have an inherent tendency to swing outwardly with the resultant advantage of remaining taut.

We claim:

1. The method of packaging a commodity consisting of relatively small units such as apples and the like, for display, which comprises the steps of placing in a prescribed position a wrapper element comprising a central relatively long band and wide end panels, placing over the band a wrapper sheet of transparent material; then assembling the units in a prescribed stacked arrangement on the sheet over said band; folding the panels to overlie the adjacent sides of the stack of units and to partly overlie the top of the stack; placing a sheet of relatively rigid material over the top of the stack and over the portions of the panels lying thereover; and drawing opposite sides of the transparent wrapper sheet to position against and securing it to the outer side of the last mentioned sheet to form a complete envelope about the commodity.

2. The method of packaging a commodity consisting of relatively small units such as apples and the like, for display, which comprises the steps of placing in a prescribed position a wrapper element, placing over a portion of the wrapper element a wrapper sheet of transparent material, then assembling the units in a prescribed stacked arrangement on the sheet over the intermediate portion of said wrapper sheet, folding the ends of said wrapper element to overlie the adjacent sides of the stack of units and to partly overlie the top of the stack, placing a sheet of relatively rigid material over the top of the stack and over the portions of the wrapper element lying thereover, and drawing opposite sides of the transparent wrapper sheet to position against and securing it to the outer side of the last-mentioned sheet to form a complete envelope about the commodity.

GEORGE W. WALLACE.
JAMES W. TREW.

REFERENCES CITED

The following references are of record in the file of this patent:

UNITED STATES PATENTS

| Number | Name | Date |
| --- | --- | --- |
| Re. 9,942 | Howe | Nov. 22, 1881 |
| 1,104,739 | Sevigne | July 21, 1914 |
| 1,830,342 | Stokes | Nov. 3, 1931 |
| 1,840,053 | Prince | Jan. 5, 1932 |
| 1,871,805 | Parsons et al. | Aug. 16, 1932 |
| 1,902,760 | Chase | Mar. 21, 1933 |
| 1,929,217 | Rosen | Oct. 3, 1933 |
| 2,106,640 | Kovalik | Jan. 25, 1938 |
| 2,168,583 | Ringler | Aug. 8, 1939 |
| 2,281,165 | Miller | Apr. 28, 1942 |
| 2,364,297 | James | Dec. 5, 1944 |
| 2,368,797 | Bailar | Feb. 6, 1945 |